United States Patent
Liu

(10) Patent No.: US 9,363,299 B2
(45) Date of Patent: Jun. 7, 2016

(54) UNIFIED COMMUNICATIONS-BASED VIDEO CONFERENCE CALL METHOD, DEVICE AND SYSTEM

(71) Applicant: Huawei Technologies Co., Ltd., Shenzhen (CN)

(72) Inventor: Yuan Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/984,807

(22) Filed: Dec. 30, 2015

(65) Prior Publication Data

US 2016/0112469 A1    Apr. 21, 2016

Related U.S. Application Data

(63) Continuation of application No. PCT/CN2013/078606, filed on Jul. 1, 2013.

(51) Int. Cl.
| | |
|---|---|
| *H04L 12/18* | (2006.01) |
| *H04N 7/15* | (2006.01) |
| *H04L 29/06* | (2006.01) |
| *H04L 29/12* | (2006.01) |

(52) U.S. Cl.
CPC ............ *H04L 65/1069* (2013.01); *H04L 61/10* (2013.01); *H04L 65/403* (2013.01); *H04L 67/42* (2013.01); *H04N 7/152* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,106,716 | B2 * | 8/2015 | Zhou ................. | H04L 12/1818 |
| 2003/0108002 | A1 * | 6/2003 | Chaney ............. | H04L 12/1818 |
| | | | | 370/261 |
| 2008/0281975 | A1 * | 11/2008 | Qiu .................... | H04L 65/1069 |
| | | | | 709/230 |
| 2009/0168985 | A1 * | 7/2009 | Yu ...................... | H04L 12/1822 |
| | | | | 379/202.01 |
| 2010/0061228 | A1 * | 3/2010 | Grabelsky .......... | H04L 12/5692 |
| | | | | 370/221 |
| 2011/0142035 | A1 * | 6/2011 | Ku ..................... | H04L 63/0853 |
| | | | | 370/352 |
| 2013/0066974 | A1 * | 3/2013 | Yoakum ............. | H04L 65/1069 |
| | | | | 709/205 |
| 2014/0254491 | A1 * | 9/2014 | Lindholm .......... | H04L 65/1016 |
| | | | | 370/328 |

* cited by examiner

*Primary Examiner* — Joseph J Nguyen

(74) *Attorney, Agent, or Firm* — Conley Rose, P.C.; Grant Rodolph

(57) ABSTRACT

A unified communications (UC)-based video conference call method and system, and a device, where receiving, by a first UC client, a request for querying call information of a second video conference terminal (VCT), where the request includes an identifier of a called contact; sending the query request to a UC server, and receiving the call information of the second VCT; and sending, by the first UC client, the call information of the second VCT to a first VCT, hence the first VCT initiates a video conference call to the second VCT according to the call information of the second VCT. By integrating a personal computer (PC)-based UC system with a hardware video conference system that is based on a digital signal processor (DSP) and embedded software, a high-quality video conference can be initiated and held using a UC client, thereby boosting user experience and enhancing product competitiveness.

14 Claims, 10 Drawing Sheets

UNIFIED COMMUNICATIONS-BASED VIDEO CONFERENCE CALL METHOD, DEVICE AND SYSTEM

CROSS-REFERENCE TO RELATED APPLICATIONS

This application is a continuation of International Application No. PCT/CN2013/078606, filed on Jul. 1, 2013, which is hereby incorporated by reference in its entirety.

TECHNICAL FIELD

The present disclosure relates to the video conference field, and in particular, to a unified communications (UC)-based video conference call method and system, and a device.

BACKGROUND

A video conference system is generally defined as a software and hardware system in which two or more users in different locations exchange information such as audio, video, and data files using audio capture devices, camera devices, audio output devices, display devices, and a communications network, so as to implement instant interaction and communication. Depending on different implementation manners, current video conference systems are generally categorized into personal computer (PC)-based software video conference systems, and hardware video conference systems that are based on a digital signal processor (DSP) and embedded software.

An existing PC-based unified communications system, such as Microsoft Lync and Skype, generally uses a universal serial bus (USB) camera of a PC host to capture a video image, uses a USB microphone to capture audio, uses a display to display the video image, and uses a loudspeaker to play an audio signal. Video communication in a UC software manner is convenient, supports a variety of services such as instant messaging, and may implement collaboration with PC office software (for example, WINDOWS OFFICE).

A video conference terminal based on a hardware scheme generally uses an independent camera. A photographed video signal is input into a conference terminal using an interface such as a digital visual interface (DVI) and a high definition multimedia interface (HDMI), and an audio signal is captured using an independent microphone/microphone array. The conference terminal generally uses a platform such as a DSP/field programmable gate array (FPGA)/application-specific integrated circuits (ASIC) chip to perform audio and video processing and encoding/decoding, encodes a locally captured image and an audio signal that is locally picked up and sends them to a remote end, and outputs, using a video interface or an audio interface, a decoded image and audio signal from the remote end to the display device for displaying and to the speaker for playing respectively.

Based on research on the foregoing two implementation solutions, the inventor finds the following problems in the two implementation solutions in the prior art:

The PC-based UC video conference system generally uses a USB camera, but the USB camera has a small image sensor and a small lens, and the camera lacks image signal processing (ISP) or has a limited processing capability. Therefore, an image effect of the camera is inferior. Due to bandwidth limitation of a USB interface, an image resolution and a frame rate of a video image is relatively low. Due to limitation of a computing capability of a PC, a high resolution and a high frame rate cannot be implemented, for example, encoding and decoding of a 1080p60 video cannot be implemented. In addition, effects of encoding and decoding are not satisfactory enough. Further, the PC-based UC video conference system is characterized by a complicated software scheme, difficult to deploy and maintain, and vulnerable to attacks of computer viruses and malicious software, resulting in poor security. A video conference system based on a hardware scheme generally uses a remote control as a human-computer interaction interface. An operation interface is displayed on a television set, and a video image is generally displayed on a full screen after a call is made successfully. However, due to use of a dedicated hardware platform, the system is not well scalable and provides few types of services, and can hardly provide other services except audio and video communication functions. The system cannot collaborate well with PC office software and the like, and is relatively costly.

SUMMARY

Based on this, embodiments of the present disclosure provide a UC-based video conference call method and system, and a device, which can effectively enhance effects of a video conference call.

One aspect of the present disclosure provides a UC-based video conference subsystem, including a video conference terminal (VCT) that incorporates a video processing module and a call control module and is connected to a network, where the subsystem further includes a PC host, a UC client, and a user input device. The UC client is installed on the PC host and the PC host is connected to the network. The VCT is connected to the PC host while the UC client incorporates a VCT application module and a UC-VCT communications module, and the VCT incorporates a VCT-UC communications module. The VCT application module is configured to receive a request for querying call information of a called VCT, send the query request to a UC server, receive the call information of the called VCT that is returned by the UC server, and send the call information of the called VCT to the UC-VCT communications module. The VCT application module is further configured to receive an incoming video conference call message that includes an incoming call number, send a calling party information query request that includes the incoming video conference call message to the UC server, receive calling party information of the video conference call, where the calling party information is queried and obtained by the UC server according to the incoming call number, output the calling party information of the video conference call in a visual manner, receive a call answer or reject request input by a user, and send the request to the UC-VCT communications module. The UC-VCT communications module is configured to establish a communication channel between the UC client and the VCT, receive the call information of the called VCT, and send the call information of the called VCT to the VCT-UC communications module of the VCT. The UC-VCT communications module is further configured to receive the call answer or reject request, and send the call answer or reject request to the VCT-UC communications module. The VCT-UC communications module is connected to the call control module, and is configured to receive call information of a called VCT sent by the UC-VCT communications module, and send the call information of the called VCT to the call control module. The VCT-UC communications module is further configured to receive the incoming video conference call message that includes the incoming call number, send the incoming video conference call message to the VCT application module using the UC-VCT communications module, receive the call answer or reject request, and send the call answer or reject request to the call control module. The call control module of the VCT is configured to receive the call information of the called VCT, and initiate a video conference call to the called VCT according to the call information of the called VCT. The call control module of the VCT is further configured to receive the call answer or reject request, and perform an operation of answering or rejecting the incoming call. The user input device is connected to the PC host, and is configured to receive the request for querying the call information of the called VCT, and send the query request to the VCT application module.

Optionally, the video processing module of the VCT is further configured to implement switching among the following three types of images and overlay of at least two of the three types of images: a PC host interface image, a video image captured on a local conference site, and an acquired image of one or more other video conference sites.

The conference site mentioned in the present disclosure means, in a physical sense, space necessarily required for accommodating video conference devices and participants (including desks and chairs), and in a logical sense, a site that accesses a video conference, including a video conference device used to access a conference.

The local conference site mentioned in the present disclosure refers to a conference site (not a specially specified conference site) in a video conference, and is named for a primary purpose of describing technical solutions of the present disclosure.

The other conference sites mentioned in the present disclosure refer to other conference sites that are involved in a same video conference as the local conference site. When the video conference is a point-to-point video conference, there is one other conference site. When the video conference is a video conference formed by multiple points, there are multiple other conference sites.

Optionally, the PC host further includes a user input device control module configured to implement switching, between the PC host and the VCT, of control rights on the user input device.

One aspect of the present disclosure provides a unified communications UC-based video conference call method, including receiving, by a VCT application module of a first UC client, a request for querying call information of a second VCT serving as a called party, where the second VCT is a VCT used by a called contact, and the request includes an identifier of the called contact. Sending, by the VCT application module of the first UC client, the query request to a UC server, and receiving the call information of the second VCT, where the call information is queried and obtained by the UC server according to the identifier of the called contact in the query request. Sending, by the VCT application module of the first UC client, the call information of the second VCT to a call control module of a first VCT using a UC-VCT communications module of the first UC client and a VCT-UC communications module of the first VCT, so that the call control module of the first VCT initiates a video conference call to the second VCT according to the call information of the second VCT.

Optionally, the call information of the second VCT is a network address of the second VCT. Sending, by the VCT application module of the first UC client, the query request to a UC server, and receiving the call information of the second VCT, where the call information is queried and obtained by the UC server according to the identifier of the called contact in the query request, further includes sending, by the VCT application module of the first UC client, the query request to the UC server, and receiving the network address of the second VCT, where the network address is queried and obtained by the UC server from a contact database according to the identifier of the called contact in the query request. Sending, by the VCT application module of the first UC client, the call information of the second VCT to a call control module of a first VCT using a UC-VCT communications module and a VCT-UC communications module of the first VCT, so that the call control module of the first VCT initiates a video conference call to the second VCT according to the call information of the second VCT, further includes sending, by the VCT application module of the first UC client, the network address of the second VCT to the call control module of the first VCT using the UC-VCT communications module and the VCT-UC communications module of the first VCT, so that the call control module of the first VCT initiates the video conference call to the second VCT according to the network address of the second VCT.

Optionally, before the sending, by the VCT application module of the first UC client, the query request to a UC server, the method further includes registering, by the first VCT and the second VCT, with a gatekeeper (GK) in a video conference network, and establishing a mapping relationship between VCT numbers and VCT network addresses on the GK. Sending, by the VCT application module of the first UC client, the query request to a UC server, and receiving the call information of the second VCT, where the call information is queried and obtained by the UC server according to the identifier of the called contact in the query request, includes receiving, by the VCT application module of the first UC client, a number of the second VCT, where the number is queried and obtained by the UC server from a contact database according to the identifier of the called contact in the query request. After the VCT application module of the first UC client sends the number of the second VCT to the VCT-UC communications module of the first VCT using the UC-VCT communications module, the method further includes querying, by the VCT-UC communications module of the first VCT, the GK for a network address of the second VCT according to the number of the second VCT, and initiating, by the call control module of the first VCT, a video conference call to the second VCT according to the call information of the second VCT includes initiating, by the call control module of the first VCT, the video conference call to the second VCT according to the network address of the second VCT.

Optionally, when there are at least two second VCTs, the method further includes sending, by the VCT application module of the first UC client, network addresses of the at least two second VCTs to the first VCT, and sending, by the VCT-UC communications module of the first VCT, a multipoint conference call request to a multipoint control server, where the request includes the network addresses of the at least two second VCTs and a network address of the first VCT. Initiating, by the multipoint control server, a multipoint conference call to the at least two second VCTs and the first VCT according to the network addresses of the at least two second VCTs and the network address of the first VCT in the request.

Optionally, when there are at least two second VCTs, before sending, by the VCT application module of the first UC client, the query request to a UC server, the method further includes registering, by the first VCT and the at least two second VCTs, with the GK in the video conference network, and establishing a mapping relationship between VCT numbers and VCT network addresses on the GK. After the VCT application module of the first UC client sends the number of the second VCT to the VCT-UC communications module of the first VCT using the UC-VCT communications module, the method further includes querying, by the VCT- UC communications module of the first VCT, the GK for network addresses of the at least two second VCTs according to numbers of the at least two second VCTs and the initiating, by the call control module of the first VCT, a video conference call to the second VCT according to the call information of the second VCT includes sending, by the call control module of the first VCT, the network addresses of the at least two second VCTs and a network address of the first VCT to a multipoint control server, so that the multipoint control server initiates the video conference call to the at least two second VCTs and the first VCT.

Another aspect of the present disclosure provides a UC-based video conference call method, including receiving, by a VCT application module of a first UC client, an incoming video conference call message, where the incoming video conference call message is received by a VCT-UC communications module of a first VCT and is sent to the first UC client using a UC-VCT communications module, and the incoming video conference call message includes an incoming call number. Sending, by the VCT application module of the first UC client, a calling party information query request that includes the incoming video conference call message to a UC server. Receiving, by the VCT application module of the first UC client, calling party information of the video conference call, where the calling party information is queried and obtained by the UC server according to the incoming call number; outputting, by the VCT application module of the first UC client, the calling party information of the video conference call in a visual manner. Receiving, by the VCT application module of the first UC client, a call answer or a reject operation request input by a user, and sending the request to a call control module of the first VCT using the UC-VCT communications module and the VCT-UC communications module, so that the call control module of the first VCT answers or rejects the incoming call according to the call answer or reject operation request.

Optionally, after receiving a call answer control command, the VCT application module of the first UC client sends the control command to a video processing module of the first VCT, so that the video processing module overlays a PC interface with a video conference call interface.

Another aspect of the present disclosure provides a VCT, incorporating a video processing module and a call control module, where the VCT further includes a VCT-UC communications module, connected to the call control module, and configured to receive call information of a called VCT sent by a UC-VCT communications module, and send the call information of the called VCT to the call control module. The VCT-UC communications module is further configured to receive an incoming video conference call message that includes an incoming call number, send the incoming video conference call message to a VCT application module using the UC-VCT communications module, receive a call answer or reject request, and send the call answer or reject request to the call control module, where the call control module is configured to receive the call information of the called VCT, and initiate a video conference call to the called VCT according to the call information of the called VCT, and is further configured to receive the call answer or reject request, and perform an operation of answering or rejecting the incoming call.

Optionally, the video processing module of the VCT is further configured to implement switching among the following three types of images and overlay of at least two of the three types of images: a PC host interface image, a video image captured on a local conference site, and an acquired image of one or more other video conference sites.

Another aspect of the present disclosure provides a UC client, where the UC client incorporates a VCT application module and a UC-VCT communications module. The VCT application module is configured to receive a request for querying call information of a called VCT, send the query request to a UC server, receive the call information of the called VCT that is returned by the UC server, and send the call information of the called VCT to the UC-VCT communications module. The VCT application module is further configured to receive an incoming video conference call message that includes an incoming call number, send a calling party information query request that includes the incoming video conference call message to the UC server, receive calling party information of the video conference call, where the calling party information is queried and obtained by the UC server according to the incoming call number, output the calling party information of the video conference call in a visual manner, receive a call answer or reject operation request input by a user, and send the request to a VCT-UC communications module using the UC-VCT communications module. The UC-VCT communications module is configured to establish a communication channel between the called VCT and the UC client, receive the call information of the called VCT, and send the call information of the called VCT to a VCT-UC communications module of the VCT. The UC-VCT communications module is further configured to receive the call answer or reject request, and send the call answer or reject request to the VCT-UC communications module.

Another aspect of the present disclosure provides a UC-based video conference system, including a UC server, a network, and at least two UC-based video conference subsystems.

Optionally, the system further includes a GK configured to establish a mapping relationship between VCT numbers and VCT network addresses, and query a network address of at least one second VCT according to a number of the at least one second VCT.

Optionally, the system further includes a multipoint control server configured to initiate a multipoint conference call to a first VCT and at least two second VCTs according to network addresses of the at least two second VCTs and a network address of the first VCT when there are at least two called contacts.

Based on the foregoing technical solutions, according to the UC-based video conference call method and system, and the device provided in the embodiments of the present disclosure, a VCT-UC communications module is integrated in a VCT, a VCT application module and a UC-VCT communications module are integrated in a UC client, and a PC-based UC system is integrated with a hardware video conference system that is based on a DSP and embedded software. Therefore, a high-quality video conference can be initiated and held using the UC client, while relatively high service scalability of the UC client is retained, thereby boosting user experience and enhancing product competitiveness.

BRIEF DESCRIPTION OF DRAWINGS

To describe the technical solutions in the embodiments of the present disclosure more clearly, the following briefly introduces the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

Generally, a program module includes a routine, a program, a component, a data structure, and structures of other types that execute a specified task or implement a specified abstract data type. In addition, a person skilled in the art may understand that the embodiments may be implemented using other computer system configurations, including a handheld device, a multi-processor system, a microprocessor-based or programmable consumable electronic product, a midrange computer, a mainframe computer, and a similar computing device. The embodiments can also be implemented in a distributed computing environment in which a task is executed by a remote processing device connected via a communications network. In the distributed computing environment, the program module may be located in a storage device of a local or remote memory.

Each embodiment may be implemented as a process or computing system implemented by a computer, or a computer storage medium of a computer program in which a computer program product or a computer system or the like executes an instruction of an exemplary process. For example, a computer-readable storage medium may be implemented by one or more of a volatile computer memory, a non-volatile memory, a hard disk drive, a flash memory drive, a floppy disk, a compact disk, and a similar medium.

Throughout this specification, the term "server" generally refers to a computing device that generally executes one or more software programs in a networking environment. However, the server may also be implemented as a virtual server (software program) that is executed by one or more computing devices deemed as servers on a network.

Figure 1:
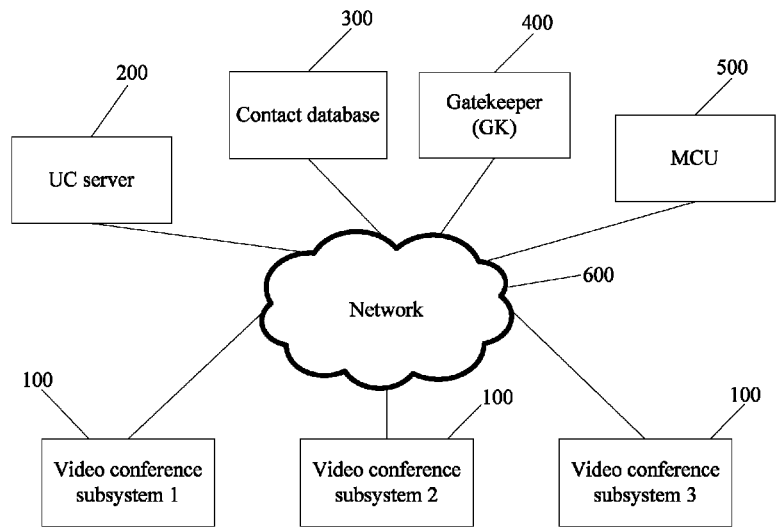
FIG. 1 is a schematic structural diagram of networking of a UC-based video conference system according to an embodiment of the present disclosure.

FIG. 1 is a schematic diagram of networking of a UC-based video conference system according to the present disclosure, where the video conference system includes: a video conference subsystem 100, including a VCT, a PC host on which a UC client is installed, a user input device, and the like, deployed in a conference site, and configured to access a video conference. A UC server 200 configured to provide a service of UC for the UC client. A contact database 300, in which contact information is stored. The contact information includes but is not limited to: a contact name, a contact number, and contact information (a fixed-line number, a mobile phone number, an instant communication account, an email, and the like), where the contact database 300 may be stored in a server separately or integrated in the UC server, which is not limited by the embodiment of the present disclosure. A GK 400, serving as a part of the video conference system configured to provide services of address translation and access control for a VCT device, and provide functions such as routing, bandwidth management, call signaling control, and other functions of packet-based network maintenance and management. A multipoint control unit (MCU) 500, used in a multipoint conference, and configured to perform synchronous separation for bit streams from conference sites, then extract information and signaling such as audio, video and data, implement corresponding processes such as mixing or switching of audio and video, data broadcasting, routing, timing, and conference control, and finally recombine all types of information required by the conference sites, and send the information to corresponding video conference subsystems.

The video conference subsystem 100, the UC server 200, the contact database 300, the GK 400, and the MCU 500 are connected using a network 600 to exchange information, where the network 600 may be a wired network or a wireless network, which is not limited by any embodiment of the present disclosure.

Figure 2:
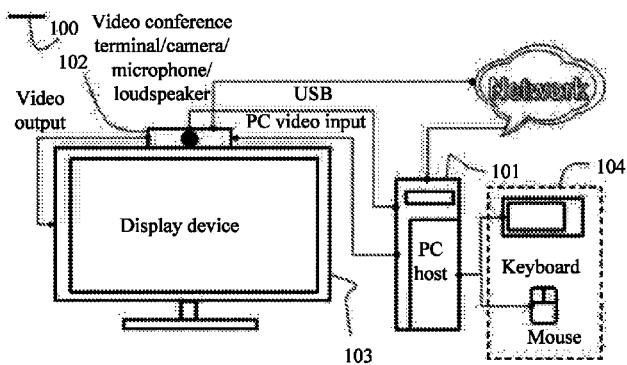
FIG. 2 is a schematic diagram of composition of a UC-based video conference subsystem according to an embodiment of the present disclosure.

FIG. 2 is a schematic diagram of networking of a UC-based video conference subsystem, where the video conference subsystem is deployed in a video conference site, and is configured to serve as a site for accessing a video conference. As shown in FIG. 2, with reference to FIG. 3, the video conference subsystem 100 includes: a PC host 101, a VCT device 102, a display device 103, and a user input device 104.

The PC host 101 is connected to a network, where a UC client 1011 is installed on the PC host 101.

The VCT device 102 is connected to the PC host 101, and incorporates an audio processing module 1023, a video processing module 1025, an audio and video codec chip 1024, a signaling module 1026, and a call control module 1022. In addition, the VCT device 102 may further incorporate an image acquisition device (not shown in the diagram, with a camera used as an example), a sound capture device (not shown in the diagram, with a microphone used as an example), and a sound play device (not shown in the diagram, with a loudspeaker used as an example). Understandably, in a specific implementation process, the image acquisition device, the sound capture device, and the sound play device may be implemented separately as independent hardware devices, which are not limited by the embodiment of the present disclosure.

A video output interface of the PC host 101 is connected to a video input interface of the VCT device 102, and a video output interface of the VCT device 102 is connected to a video input interface of the display device 103. The video interface may be the following universal interfaces: video graphics array (VGA), digital visual interface (DVI), HDMI, and display port interfaces.

The display device 103 is configured to display a video image that is of a remote conference site and received by the VCT device 102, a video image that is of a local conference site and captured by the VCT device 102, or an interface image of the PC host 101, and a result of overlaying video images of any two of the foregoing video sources.

Understandably, a display device may have diversified display manners. The display device 103 may separately display the video image that is of the local conference site and captured by the VCT device 102, the interface image of the PC host 101, or the video image that is of the remote conference site and received by the VCT device 102, or may display a combined picture of the foregoing multiple types of images. For a specific display manner, no description imposing limitation is made in any embodiment of the present disclosure.

For example:

(1) When the display device 103 separately displays a video image of a remote conference site, the display manner varies depending on whether there is one or more remote conference sites. When there is one remote conference site, the display device 103 displays only the image of the remote conference site. When there are multiple remote conference sites, the display device 103 may separately display one of the multiple remote conference sites, or display a multipicture image formed by images of at least two conference sites in the multiple remote conference sites.

(2) When the display device 103 displays a combined picture of at least two types of the following images (the video image of the local conference site, the interface image of the PC host 101, or the video image that is of the remote conference site and received by the VCT device 102), the video processing module 1025 of the VCT device 102 implements image overlay processing, and sends a result of the image combination processing to the display device 103 for displaying.

The user input device 104 is connected to the PC host 101, and is configured to receive information input by a user.

Figure 3:
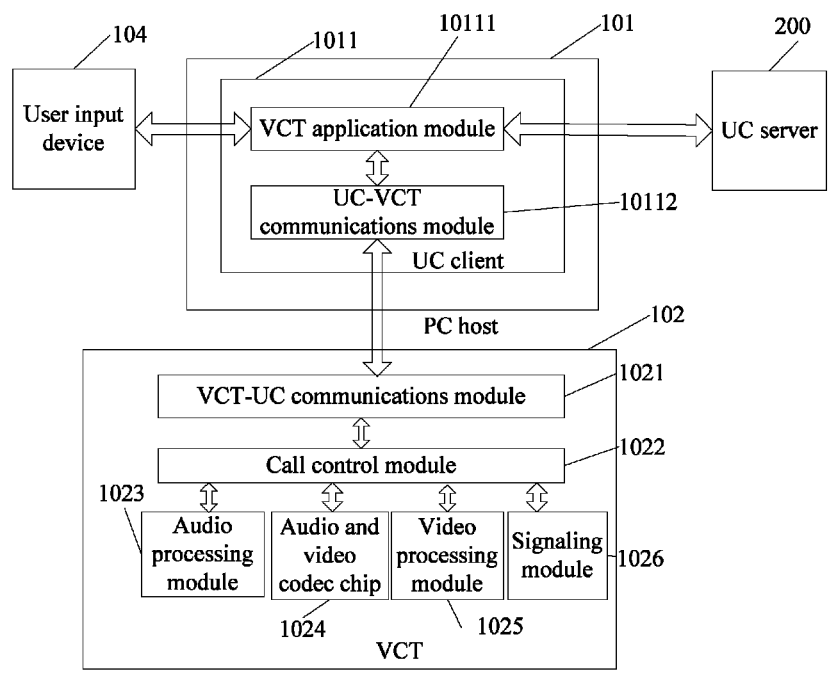
FIG. 3 is a schematic diagram of an internal structure of a UC-based video conference subsystem according to an embodiment of the present disclosure.

Referring to FIG. 3, the UC client incorporates a VCT application module 10111 and a UC-VCT communications module 10112, and the VCT 102 incorporates a VCT-UC communications module 1021.

The VCT application module 10111 is configured to receive a request for querying call information of a called VCT, send the query request to the UC server 200, receive the call information of the called VCT that is returned by the UC server 200, and send the call information of the called VCT to the UC-VCT communications module 10112. The VCT application module 10111 is further configured to receive an incoming video conference call message that includes an incoming call number, send a calling party information query request that includes the incoming video conference call message to the UC server 200, receive calling party information of the video conference call, where the calling party information is queried and obtained by the UC server 200 according to the incoming call number, output the calling party information of the video conference call in a visual manner, receive a call answer or reject operation request input by a user, and send the request to the UC-VCT communications module 10112.

The UC-VCT communications module 10112 is configured to establish a communication channel between the VCT 102 and the UC client 1011, receive the call information of the called VCT, and send the call information of the called VCT to the VCT-UC communications module 1021 of the VCT, and is further configured to receive the call answer or reject request, and send the call answer or reject request to the VCT-UC communications module 1021.

The VCT-UC communications module 1021 is connected to the call control module 1022, and is configured to receive call information of a called VCT sent by the UC-VCT communications module 10112, and send the call information of the called VCT to the call control module 1022. The VCT-UC communications module 1021 is further configured to receive the incoming video conference call message that includes the incoming call number, and send the incoming video conference call message to the VCT application module 10111 using the UC-VCT communications module 10112, receive the call answer or reject request, and send the call answer or reject request to the call control module 1022.

The call control module 1022 of the VCT is configured to receive the call information of the called VCT, and initiate a video conference call to the called VCT according to the call information of the called VCT, and is further configured to receive the call answer or reject request, and perform an operation of answering or rejecting the incoming call.

The user input device 104 is connected to the PC host 101, and is configured to receive the request for querying the call information of the called VCT, and send the query request to the VCT application module 10111.

In a process of initiating a video conference call to the called VCT, call signaling is processed using the signaling module 1026, audio and video data is processed using the audio processing module 1023 and the video processing module 1025, and audio and video data in a video conference is encoded and/or decoded using the audio and video codec chip 1024.

Optionally, the video processing module of the VCT is further configured to implement switching among a PC host interface image, a locally captured video image, and an acquired image of another video conference site, and perform an operation of overlaying video images of at least two of the foregoing three video sources.

For example, when the PC host interface and acquired video of another video conference site are presented simultaneously, the PC host interface needs to occupy a main part, and a video image of the another video conference site needs to be displayed in a window that is ⅛ of a screen. Therefore, the PC host interface and the video image of the another video conference site may be overlaid and presented simultaneously, and the video processing module 1025 of the VCT scales an input video of the another video conference site down to ⅛ of an original size to replace pixels of a same area size in a given location in the image of the PC host interface. Switching and processing of a video may be implemented using an FPGA/ASIC chip of the VCT. The FPGA/ASIC chip may perform selection between a video signal input by the PC host to the VCT and an output video signal of the VCT itself, and outputs the selected video signal to the display device, so as to implement switching of the video source, or the FPGA/ASIC chip may scale down the output video signal of the VCT, and then replace pixels in a given area of the image signal of the PC host interface, and output a video signal after the replacement to the display device, so as to implement video overlay. When two video images are overlaid, semi-transparent alpha overlay is supported, and an algorithm is as follows:

$$C=C_0(1-\alpha_1)+C_1\alpha_1$$

where $C_1$ may be a pixel color value of a video image of the PC host interface, $C_0$ is a pixel color value of a VCT video image, $\alpha_1$ is transparency represented by floating points between values 0-1, and C is a color value of pixels of an image that is output after overlay.

A specific overlay mode may be very flexible. For example, typical modes include a full-screen mode, a ¼ interface mode, and a thumbnail interface mode.

Figure 4:
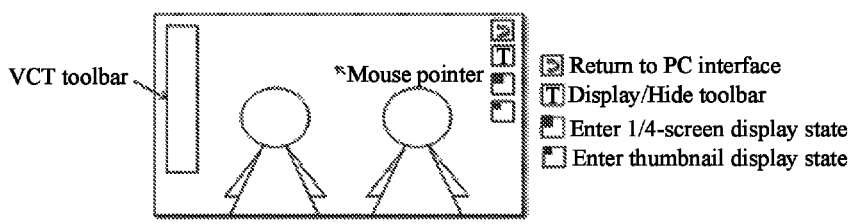
FIG. 4 is a schematic diagram of a full-screen mode in video image overlay according to an embodiment of the present disclosure.

Referring to FIG. 4, in the full-screen mode, a full screen of the VCT displays an interface of the VCT without overlay of an output image of the PC host. In this case, control rights on a mouse/keyboard are handed over to the VCT, the PC host no longer receives a message from the mouse/keyboard, and the user may use the mouse/keyboard to operate the VCT interface. The user may perform a simple control operation using an icon on the VCT interface, including: returning to a PC interface, displaying/hiding a toolbar, entering a ¼-screen display mode, entering a thumbnail display mode, and the like. To perform an advanced operation, the user may use a toolbar of the VCT.

Figure 5:
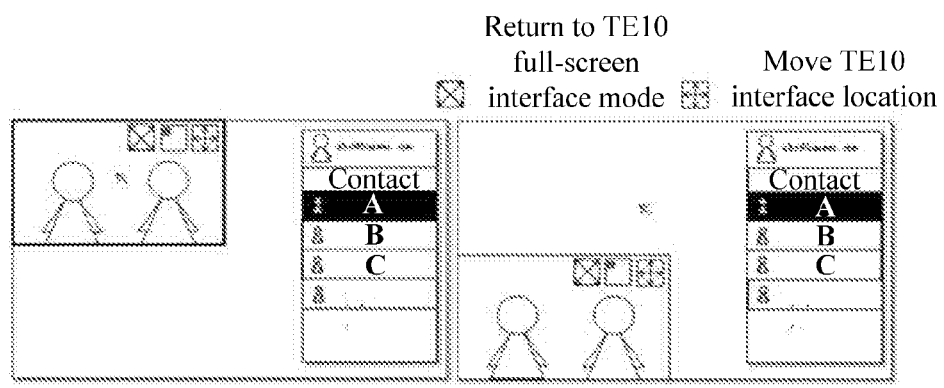
FIG. 5 is a schematic diagram of a ¼ interface mode in video image overlay according to an embodiment of the present disclosure.

Referring to FIG. 5, the ¼ interface mode is applicable to a scenario in which a VCT video image and a PC host interface need to be in sight simultaneously. In this case, the VCT scales its output image down to ¼ of an output image of the PC host and overlays its output image with the output image of the PC host, and then output an image to a display. The output image of the VCT may be a local image or a remote image of a VCT camera, or overlay of a local image and a remote image. The output image of the VCT is presented in a size equivalent to ¼ of the full screen, and the PC host interface is displayed in other display areas, which is convenient for the user to perform some operations on the PC host when the user is in a conference. A size of a VCT interface cannot be changed. However, to solve a problem of blocking, a location of the VCT interface may be shifted, and the VCT interface may be shifted to 4 locations of a screen under button control. Mouse/keyboard input control rights of the interface may be selected using a mouse. When the user clicks the VCT interface, the VCT obtains the mouse/keyboard input control rights, the interface is highlighted and the user can operate the VCT interface. When the user clicks the PC host interface, the PC host obtains the mouse/keyboard input control rights, and the user can operate the PC host interface.

Figure 6:
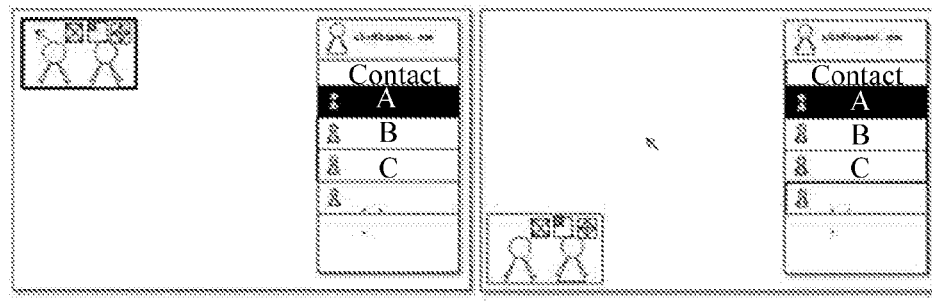
FIG. 6 is a schematic diagram of a thumbnail interface mode in video image overlay according to an embodiment of the present disclosure.

FIG. 6 shows a presentation manner in the thumbnail mode. The thumbnail mode is applicable to a scenario in which the user primarily operates the PC host without paying attention to the VCT video image. The VCT scales its output image down to a thumbnail form first, then overlays it with an image output by the PC host, and finally outputs an image to a display. This manner brings little blocking to the PC host interface. To solve the problem of blocking, the location of the VCT interface may be shifted. A method for using the thumbnail mode is similar to the method for using the ¼ interface mode.

Optionally, the UC-based video conference subsystem further includes a user input device control module configured to implement switching, between the PC host and the VCT, of control rights on the user input device.

For example, when a currently displayed interface is a PC host interface, the mouse/keyboard control rights are handed over to the PC host. When the current interface is a VCT interface, the mouse/keyboard control rights are handed over to the VCT. When the VCT interface is overlaid on the PC interface for simultaneous displaying, multiple policies may be used to control the mouse/keyboard. For example, when the user performs a mouse click operation, a current pointer location of the mouse is determined (by comparing coordinates of a mouse click location with coordinates of a VCT window area location, whether a pointer falls in the VCT interface window area is determined). If the mouse click location is in a display window area of the VCT, the mouse/keyboard control rights are handed over to the VCT, and the user can control the interface of the VCT using the keyboard/mouse. The mouse/keyboard control rights are handed over to the PC host when the mouse click location is in a display area of the PC host interface, and the user can operate the interface of the PC. The mouse/keyboard control rights of the PC host may be handed over to the VCT using a USB interface when the mouse/keyboard control is coordinated, in order to obtain a lower latency, and mouse/keyboard functions of the PC host are disabled.

In the foregoing embodiment, a VCT-UC communications module is integrated in a VCT, a VCT application module and a UC-VCT communications module are integrated in a UC client, and a PC-based UC system is integrated with a hardware video conference system that is based on a DSP and embedded software. Therefore, a high-quality video conference can be initiated and held using the UC client, while relatively high service scalability of the UC client is retained, thereby boosting user experience and enhancing product competitiveness.

Figure 7:
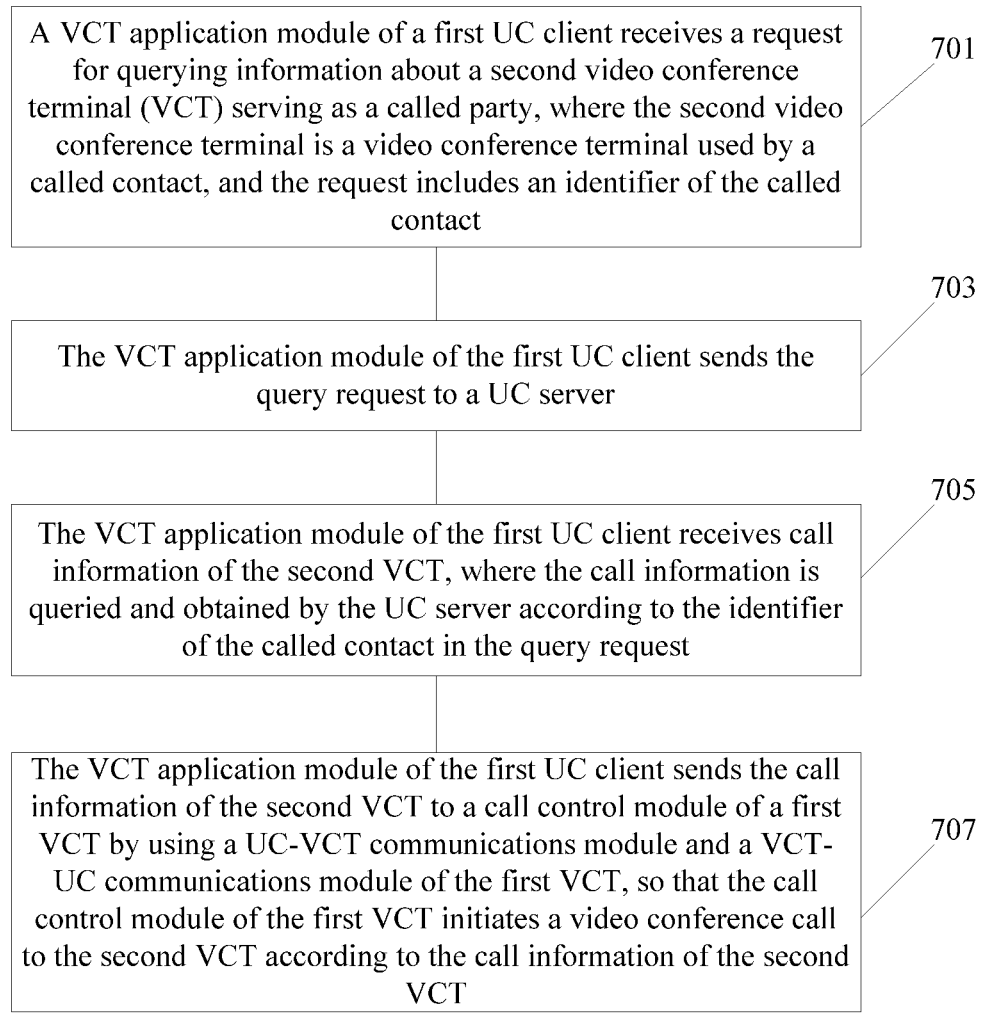
FIG. 7 is a schematic flowchart of a UC-based video conference call method according to an embodiment of the present disclosure.

Refer to FIG. 7, which shows a UC-based video conference call method according to an embodiment of the present disclosure. With reference to the structure of the UC-based video conference subsystem shown in FIG. 3, the method includes:

701: A VCT application module 10111 of a first UC client 1011 receives a request for querying information about a second VCT serving as a called party, where the second VCT is a VCT used by a called contact, and the request includes an identifier of the called contact.

The first UC client 1011 serves as a UC client used by a calling user, and the VCT application module 10111 integrated in the first UC client 1011 receives the request for querying information about the second VCT used by the called contact, where the request is sent by the calling user and includes the identifier of the called contact.

703: The VCT application module 10111 of the first UC client 1011 sends the query request to a UC server 200.

After receiving the request for querying the information about the called VCT, the VCT application module 10111 sends the query request to the UC server 200.

705: The VCT application module 10111 of the first UC client 1011 receives call information of the second VCT, where the call information is queried and obtained by the UC server 200 according to the identifier of the called contact in the query request.

The call information of the second VCT may further include the following types of information: a number for calling the VCT, a network address of the VCT, or other call-related information of the VCT. After receiving the request for querying the information about the called VCT, the UC server 200 may perform query in multiple manners according to different configuration manners and networking manners of devices in a network. The following provides two implementation manners as examples:

Manner 1: In this manner, network addresses of VCTs of contacts are stored in a contact database 300, and the UC server 200 queries the contact database 300 according to the identifier of the called contact. When a network address of the VCT of the contact is recorded in the contact database 300, the UC server 200 matches the network address of the VCT of the contact directly according to the identifier of the called contact.

Manner 2: In this manner, the contact database 300 stores only numbers of VCTs of contacts. Before a video conference is initiated, each video conference terminal registers its own number with a GK device 400, and establishes a mapping relationship between VCT numbers and VCT network addresses on the GK 400. According to the identifier of the called contact in the query request, the UC server 200 acquires a number of the VCT of the contact from the contact database 300, and sends the number to the VCT application module 10111 of the first UC client 1011. The VCT application module 10111 sends the number to the VCT-UC communications module 1021 of a first VCT 102, and the VCT-UC communications module 1021 queries a network address of the VCT of the called contact using the GK 400.

707: The VCT application module 10111 of the first UC client 1011 sends the call information of the second VCT to a call control module 1022 of a first VCT 102 using a UC-VCT communications module 10112 and a VCT-UC communications module 1021 of the first VCT 102, so that the call control module 1022 of the first VCT initiates a video conference call to the second VCT according to the call information of the second VCT.

With reference to manner 1 given as an example in step 705, the call information of the second VCT is the network address of the second VCT, and the VCT application module 10111 of the first UC client 1011 sends the network address of the second VCT to the VCT-UC communications module 1021 of the first VCT 102 using the UC-VCT communications module 10112, so that the VCT-UC communications module 1021 of the first VCT 102 sends the network address of the second VCT to the call control module 1022 of the first VCT 102, and therefore, the call control module 1022 of the first VCT 102 initiates the video conference call to the second VCT under control of the UC-VCT communications module 10112 using the network address of the second VCT.

With reference to manner 2, after the VCT application module 10111 of the first UC client 1011 sends the number of the second VCT to the VCT-UC communications module 1021 of the first VCT 102 using the UC-VCT communications module 10112, the method further includes: querying, by the VCT-UC communications module 1021 of the first VCT 102, the GK 400 for the network address of the second VCT according to the number of the second VCT. Initiating, by the call control module 1022 of the first VCT 102, a video conference call to the second VCT according to the call information of the second VCT includes: initiating, by the call control module 1022 of the first VCT 102, the video conference call to the second VCT according to the network address of the second VCT.

When there are at least two called contacts, that is, when a video conference call involving three or more parties is implemented, for the two different implementation manners in step 705:

For manner 1 in step 705: The VCT application module 10111 of the first UC client 1011 sends network addresses of at least two second VCTs to the first VCT 102, and the VCT-UC communications module 1021 of the first VCT 102 sends a multipoint conference call request to a MCU 500, where the request includes the network addresses of the at least two second VCTs and a network address of the first VCT. The MCU 500 initiates a multipoint conference call to the first VCT 102 and the at least two second VCTs according to the network addresses of the at least two second VCTs and the network address of the first VCT in the request.

For manner 2 in step 705: Before the sending, by the VCT application module 10111 of the first UC client 1011, the query request to a UC server 200, the method further includes registering, by the first VCT 102 and at least two second VCTs, with the GK 400 in a video conference network, and establishing a mapping relationship between VCT numbers and VCT network addresses on the GK 400. After the VCT application module 10111 of the first UC client 1011 sends the number of the second VCT to the VCT-UC communications module 1021 of the first VCT 102 using the UC-VCT communications module 10112, the method further includes querying, by the VCT-UC communications module 1021 of the first VCT 102, the GK 400 for network addresses of the at least two second VCTs according to numbers of the at least two second VCTs. Initiating, by the call control module 1022 of the first VCT 102, a video conference call to the second VCT according to the call information of the second VCT includes sending, by the VCT-UC call control module 1022 of the first VCT 102, the network addresses of the at least two second VCTs and the network address of the first VCT 102 to a MCU 500, so that the MCU 500 initiates a video conference call to at least two second VCTs and the first VCT 102.

In the foregoing embodiment, a VCT-UC communications module is integrated in a VCT, a VCT application module and a UC-VCT communications module are integrated in a UC client, and a PC-based UC system is integrated with a hardware video conference system that is based on a DSP and embedded software. Therefore, in a process of implementing a call, a high-quality video conference can be initiated and held using the UC client, thereby boosting user experience and enhancing product competitiveness.

Figure 8:
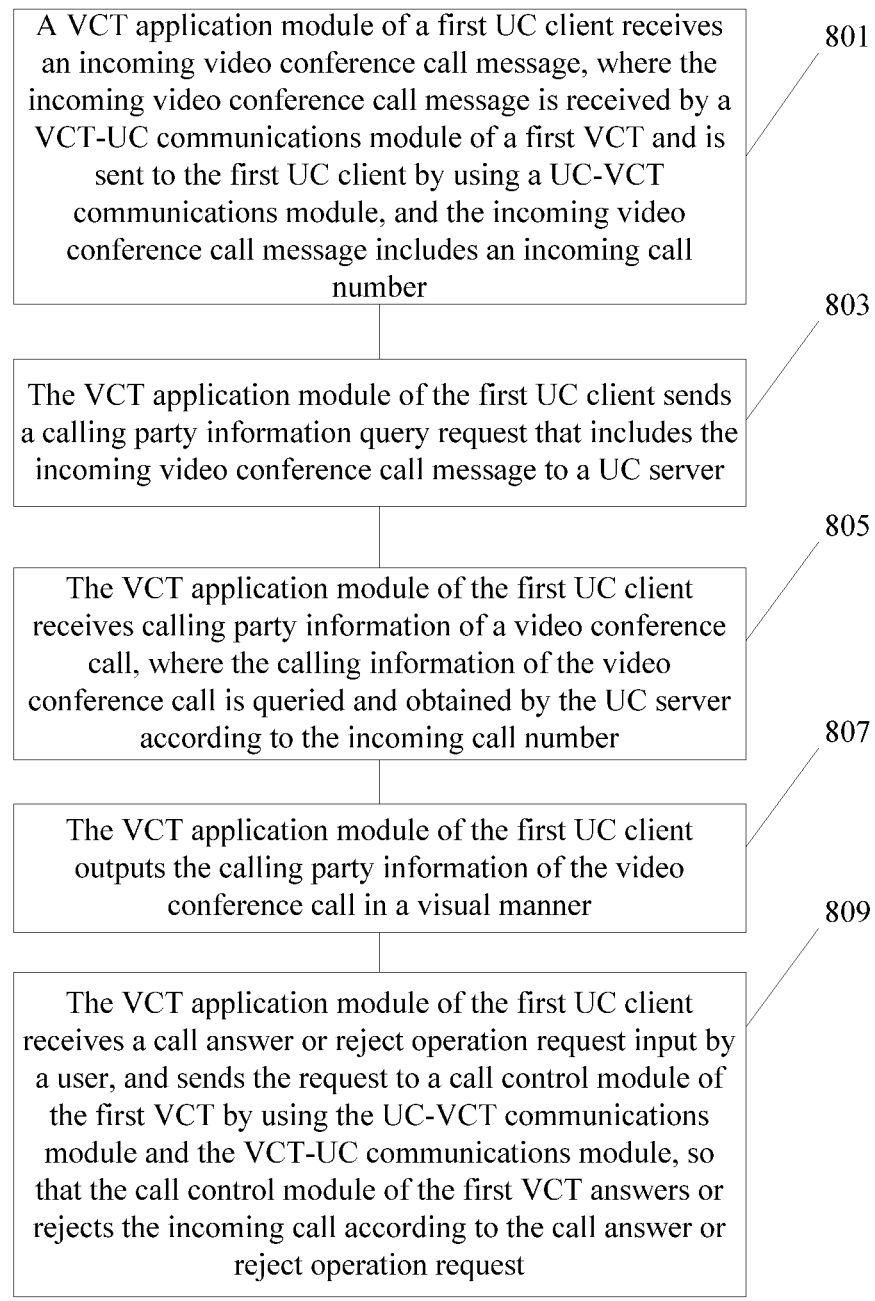
FIG. 8 is a schematic flowchart of a UC-based video conference call method according to another embodiment of the present disclosure.

Refer to FIG. 8, which is another method embodiment of a UC-based video conference call and is applicable to implementing answering of a UC-based video conference call. With reference to FIG. 3, the method includes:

801: A VCT application module 10111 of a first UC client 1011 receives an incoming video conference call message, where the incoming video conference call message is received by a VCT-UC communications module 1021 of a first VCT 102 and is sent to the first UC client 1011 using a UC-VCT communications module 10112, and the incoming video conference call message includes an incoming call number.

As an example, after receiving a video conference call initiated by another VCT or a MCU, the VCT-UC communications module 1021 of the first VCT 102 sends an incoming video conference call message to the VCT application module 10111 of the first UC client 1011 using the UC-VCT communications module 10112, where the incoming call message of the call includes an incoming call number of a calling party.

803: The VCT application module 10111 of the first UC client 1011 sends a calling party information query request that includes the incoming video conference call message to a UC server 200.

805: The VCT application module 10111 of the first UC client 1011 receives calling party information of the video conference call, where the calling party information is queried and obtained by the UC server 200 according to the incoming call number.

After receiving the incoming video conference call message that includes the incoming call number, the UC server 200 extracts the incoming call number from the message, queries a contact database 300 and obtains calling party information corresponding to the incoming call number, and sends the calling party information to the VCT application module 10111 of the first UC client 1011, where the calling party information includes but is not limited to a name of the calling party.

807: The VCT application module 10111 of the first UC client 1011 outputs the calling party information of the video conference call in a visual manner.

Figure 9:
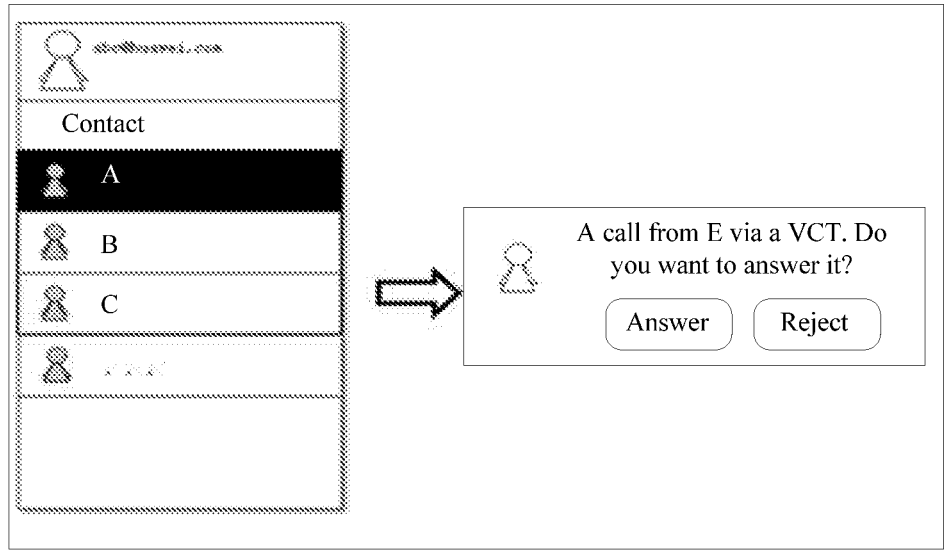
FIG. 9 is a schematic diagram of display of a call interface according to the another embodiment of the present disclosure shown in FIG. 8.

For example, the VCT application module 10111 of the first UC client 1011 outputs the calling party information of the video conference call in a visual menu prompt manner, as shown in FIG. 9.

809: The VCT application module 10111 of the first UC client 1011 receives a call answer or reject operation request input by a user, and sends the request to a call control module 1022 of the first VCT using the UC-VCT communications module 10112 and the VCT-UC communications module 1021, so that the call control module 1022 of the first VCT 102 answers or rejects the incoming call according to the call answer or reject operation request.

In step 807, after the VCT application module 10111 outputs the calling party information of the video conference call in a visual manner, the VCT application module 10111 controls, according to the user's selection of whether to answer the call, answering or rejecting of the incoming call.

In the foregoing embodiment, a VCT-UC communications module is integrated in a VCT, a VCT application module and a UC-VCT communications module are integrated in a UC client, and a PC-based UC system is integrated with a hardware video conference system that is based on a DSP and embedded software. Therefore, in a process of implementing a call, answering of a video conference call can be implemented using the UC client, thereby boosting user experience and enhancing product competitiveness.

FIG. 10 to FIG. 13 are flowcharts of implementing a video conference call based on UC in a point-to-point call scenario (that is, a circumstance of making a video conference call between two parties) and a multipoint call scenario (that is, a circumstance of making a video conference call among three or more parties) separately, which are detailed below.

Before description is made, it should be pointed out that a called VCT in the embodiments of the present disclosure may be a VCT incorporating an audio processing module, a video processing module, an audio and video codec chip, a signaling module, and a call control module, and connected to a network, or may be a UC-based video conference subsystem shown in FIG. 2, which is not limited by the embodiments of the present disclosure.

Figure 10:
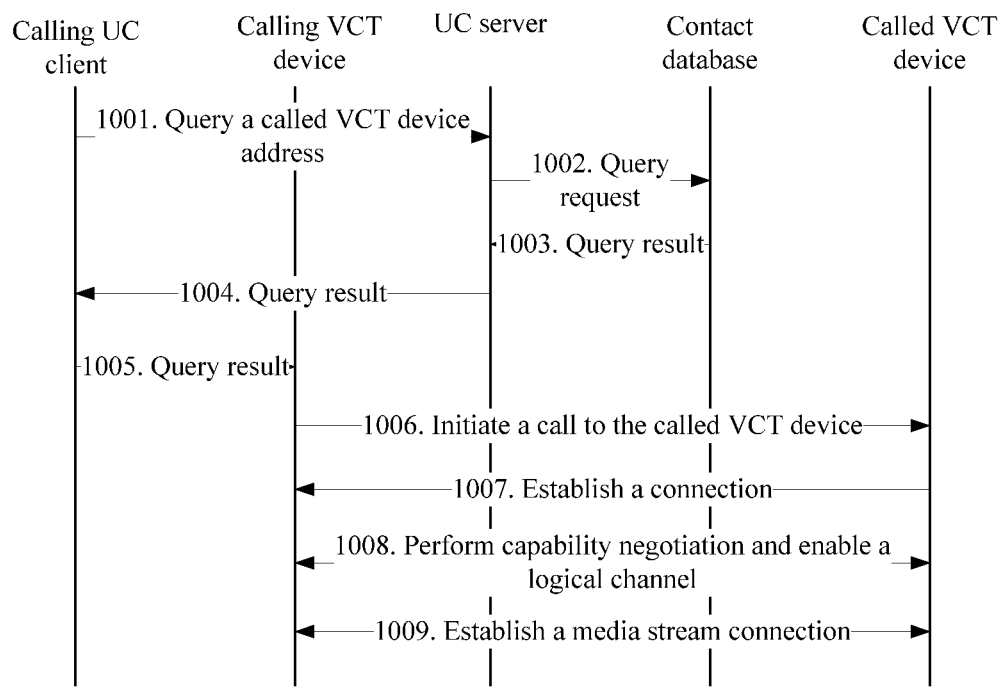
FIG. 10 is a schematic flowchart of a first specific embodiment of a UC-based video conference call method according to the present disclosure.

Refer to FIG. 10, which shows a circumstance, in a point-to-point call scenario, of querying a network address of a called VCT device using a contact database and initiating a call directly using the network address.

1001: After receiving a request that is for querying a called VCT device address and includes an identifier of a called contact, a calling UC client sends the request for querying the called VCT device address to a UC server, where the query request includes identification information of the called contact.

This step is further performed by a VCT application module of the calling UC client.

1002: The UC server sends the query request that includes the identification information of the called contact to a contact database, and queries the contact database for a network address of a VCT of the called contact.

1003: The contact database returns a result of querying the called VCT device address. The query result includes the network address of the called VCT when the network address of the called VCT is found. If the network address of the called VCT is not found, the result is null.

1004: The UC server returns the query result to the calling UC client.

Furthermore, the query result is returned to the VCT application module of the calling UC client.

1005: The calling UC client forwards the query result to a calling VCT device.

Furthermore, the VCT application module of the calling UC client forwards the query result to a VCT-UC communications module of the calling VCT device.

1006: When the query result includes the address of the called VCT, a VCT-UC communications module of the calling VCT device triggers a call control module to initiate a call to the called VCT device. When the query result is null, the process is ended.

1007: The called VCT device establishes a communication connection to the calling VCT device.

1008: The calling VCT device and the called VCT device perform capability negotiation to enable a logical channel.

1009: The calling VCT device and the called VCT device establish a media stream connection to implement video conference communication.

Steps 1007 to 1009 are an existing call process of a VCT, and details are not repeated herein.

Figure 11:
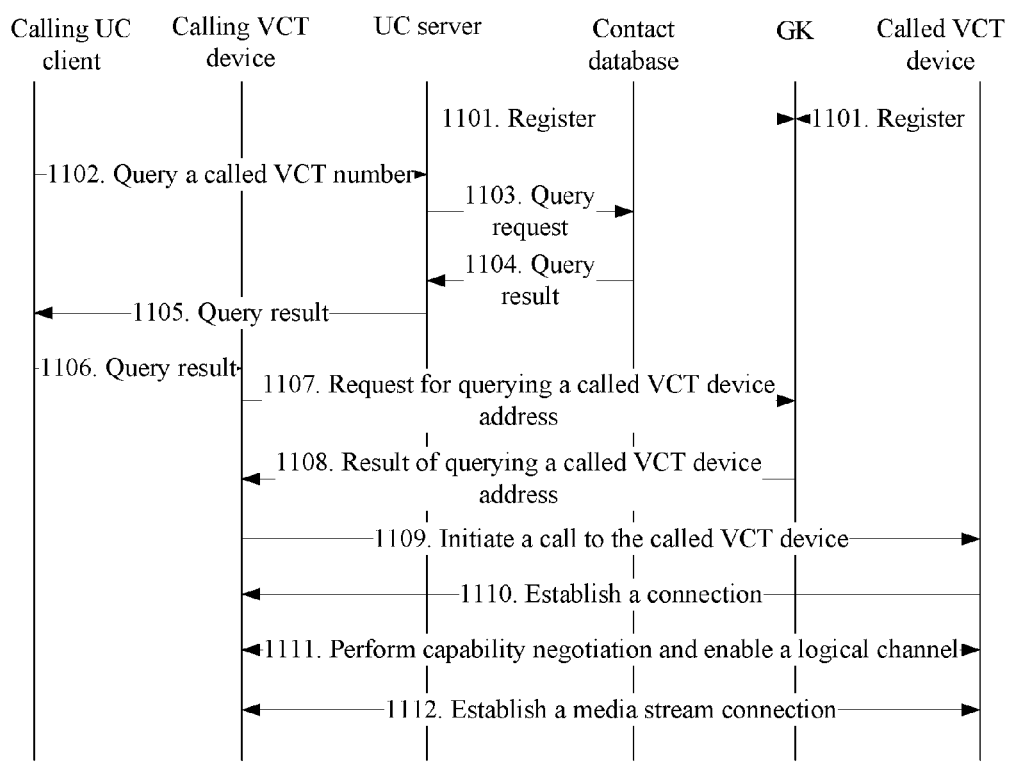
FIG. 11 is a schematic flowchart of a second specific embodiment of a UC-based video conference call method according to the present disclosure.

Refer to FIG. 11, which shows a circumstance, in a point-to-point call scenario, of querying a number of a called VCT device using a contact database, querying a network address of the called VCT via a GK using the number, and initiating a call using the network address.

1101: Both a calling VCT device and a called VCT device register with a GK, so that a mapping relationship between VCT numbers and VCT network addresses is established on the GK.

1102: A calling UC client sends a request for querying a number of the called VCT to a UC server, where the query request includes an identifier of a called contact.

1103: The UC server sends a request for querying a VCT number of the called contact to a contact database.

1104: The contact database returns a query result to the UC server. The query result includes the called VCT number when the called VCT number is found. When the called VCT number is not found, the query result is null.

1105: The UC server returns the query result to the calling UC client.

1106: The calling UC client forwards the query result to the calling VCT device.

1107: The calling VCT device extracts the called VCT number, and sends a request for querying a called VCT device address to the GK when the query result includes the called VCT number. When the query result is null, the process is ended.

1108: The GK returns a result of querying the network address of the called VCT device to the calling VCT device.

1109: The calling VCT device initiates a video conference call to the called VCT device.

1110: The calling VCT device and the called VCT device establish a communication connection.

1111: The calling VCT device and the called VCT device perform capability negotiation and enable a logical channel.

1112: The calling VCT device and the called VCT device establish a media stream connection.

Steps 1109 to 1112 are an existing call process of a VCT, and details are not repeated herein.

Figure 12:
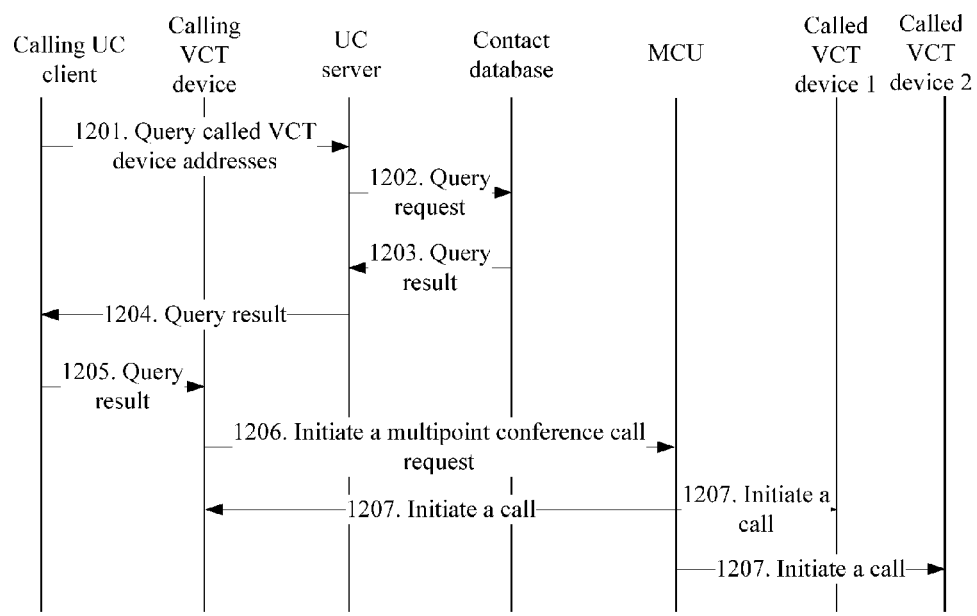
FIG. 12 is a schematic flowchart of a third specific embodiment of a UC-based video conference call method according to the present disclosure.

Refer to FIG. 12, which shows a circumstance, in a point-to-multipoint call scenario, of querying network addresses of at least two called VCT devices directly using a contact database and initiating a call using the network addresses of the at least two called VCT devices, where a system includes at least two called VCT devices.

1201: After receiving a request for querying called VCT device addresses that includes identifiers of at least two called contacts, a calling UC client sends the request for querying the called VCT device addresses to a UC server, where the query request includes identification information of the at least two called contacts.

This step is further performed by a VCT application module of the calling UC client.

1202: The UC server sends the query request that includes the identification information of the at least two called contacts to a contact database, and queries the contact database for addresses of VCTs of the at least two called contacts.

1203: The contact database returns a result of querying the called VCT device addresses. The query result includes the addresses of the called VCTs when the addresses of the called VCTs are found. If the addresses of the called VCTs are not found, the result is null.

1204: The UC server returns the query result to the calling UC client.

Furthermore, the query result is returned to the VCT application module of the calling UC client.

1205: The calling UC client forwards the query result to a calling VCT device.

Furthermore, the VCT application module of the calling UC client forwards the query result to a VCT-UC communications module of the calling VCT device.

1206: The calling VCT device initiates a multipoint conference call request to an MCU, where the call request includes the network addresses of the at least two called VCTs and a network address of the calling VCT.

1207: The MCU initiates a video conference call to the calling VCT device and the at least two called VCT devices using the network addresses of the at least two called VCTs and the network address of the calling VCT.

The process of initiating the video conference call to multiple VCTs by the MCU in step 1207 is covered in the prior art, and details are not repeated in the embodiment of the present disclosure.

Figure 13:
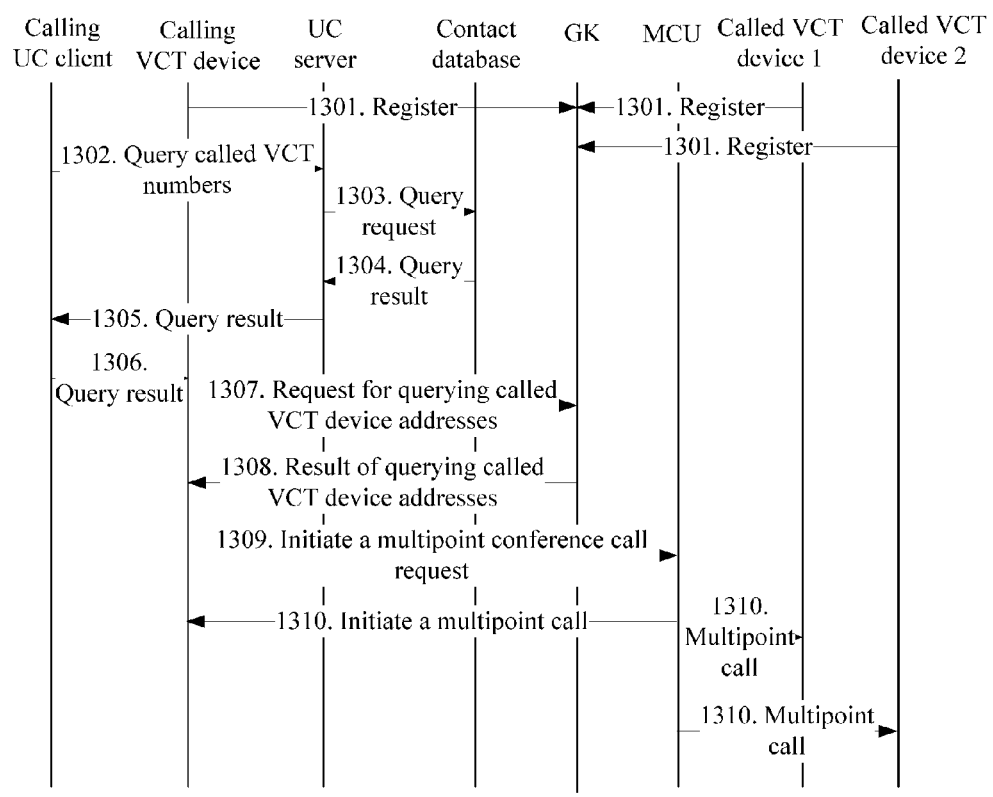
FIG. 13 is a schematic flowchart of a fourth specific embodiment of a UC-based video conference call method according to the present disclosure.

Refer to FIG. 13, which shows a circumstance, in a point-to-multipoint call scenario, of querying numbers of at least two called VCT devices using a contact database, querying network addresses of the at least two called VCTs via a GK using the numbers, and initiating a call using the network addresses.

1301: A calling VCT device and at least two called VCT devices register with a GK, so that a mapping relationship between VCT numbers and VCT network addresses is established on the GK.

1302: A calling UC client initiates a request for querying numbers of the at least two called VCTs to a UC server, where the query request includes identifiers of at least two called contacts.

1303: The UC server sends a request for querying VCT numbers of the at least two called contacts to a contact database.

1304: The contact database returns a query result to the UC server. The query result includes the numbers of the at least two called VCTs when the called VCT numbers are found. The query result is null when the called VCT numbers are not found.

1305: The UC server returns the query result to the calling UC client.

1306: The calling UC client forwards the query result to the calling VCT device.

1307: When the query result includes the numbers of the at least two called VCTs, the calling VCT device extracts the numbers of the at least two called VCTs, and sends a request for querying called VCT device addresses to the GK. The process is ended when the query result is null.

1308: The GK returns a result of querying the network addresses of the at least two called VCT devices to the calling VCT device.

1309: The calling VCT device initiates a multipoint conference call request to an MCU, where the request includes the network addresses of the at least two called VCT devices and a network address of the calling VCT device.

1310: The MCU initiates a multipoint conference call to the at least two called VCT devices and the calling VCT device.

The process of initiating the video conference call to multiple VCTs by the MCU in step 1310 is covered in the prior art, and details are not repeated in the embodiment of the present disclosure.

Figure 14:
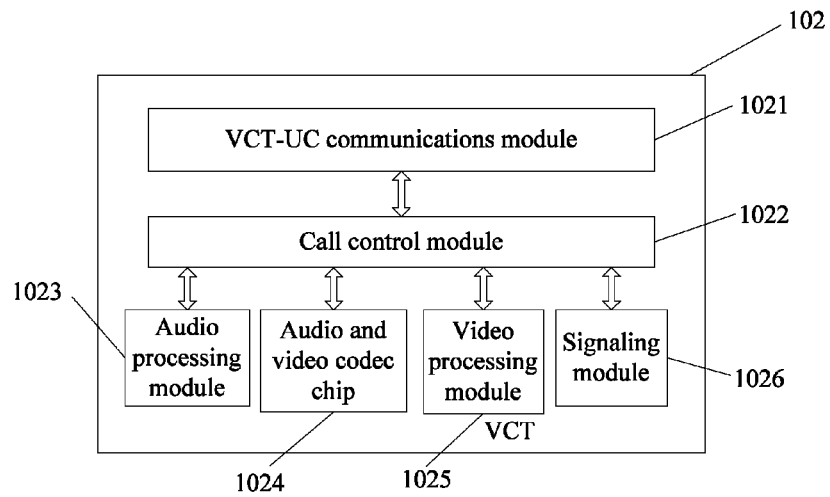
FIG. 14 is a schematic diagram of a structure of a VCT embodiment according to the present disclosure.

Referring to FIG. 14, an embodiment of the present disclosure further provides a VCT 102, incorporating an audio processing module 1023, a video processing module 1025, an audio and video codec chip 1024, a signaling module 1026, and a call control module 1022, where the VCT 102 further includes a VCT-UC communications module 1021 configured to receive call information of a called VCT sent by a UC-VCT communications module 10112, and send the call information of the called VCT to the call control module 1022. The VCT-UC communications module 1021 further configured to receive an incoming video conference call message that includes an incoming call number, and send the incoming video conference call message to a VCT application module 10111 using the UC-VCT communications module 10112, where the call control module 1022 is configured to receive the call information of the called VCT, and initiate a video conference call to the called VCT according to the call information of the called VCT, and is further configured to receive the call answer or reject request, and perform an operation of answering or rejecting the incoming call.

Optionally, the video processing module 1025 of the VCT is further configured to implement among the following three types of images and overlay of at least two of the three types of images: a PC host interface image, a video image captured locally, and an acquired image of one or more other video conference sites.

Figure 15:
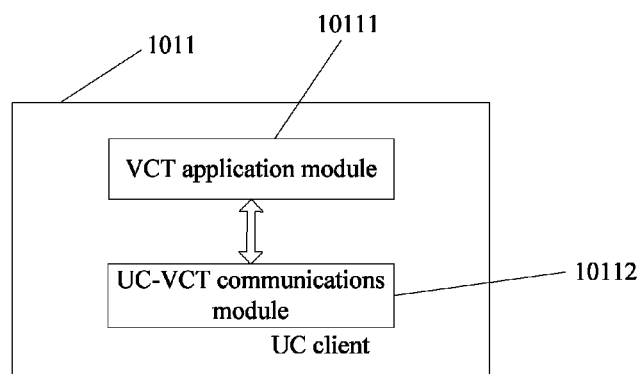
FIG. 15 is a schematic diagram of a structure of a UC client embodiment according to the present disclosure.

Referring to FIG. 15 and referring to FIG. 3, an embodiment of the present disclosure provides a UC client, where the UC client 1011 incorporates a VCT application module 10111.

The VCT application module 10111 is configured to receive a request for querying call information of a called VCT, send the query request to a UC server 200, receive the call information of the called VCT that is returned by the UC server 200, and send the call information of the called VCT to a UC-VCT communications module 10112. The VCT application module 10111 is further configured to receive an incoming video conference call message that includes an incoming call number, send the incoming video conference call message to the UC server 200, receive calling party information of the video conference call, where the calling party information is queried and obtained by the UC server 200 according to the incoming call number, output the calling party information of the video conference call in a visual manner, receive a call answer or reject operation request input by a user, and send the request to a VCT-UC communications module 1021 using the UC-VCT communications module 10112.

Referring to FIG. 1, an embodiment of the present disclosure further provides a UC-based video conference system, including a UC server 200, a network 600, and at least two unified communications UC-based video conference subsystems 100.

Optionally, the video conference system further includes a GK 400 configured to establish a mapping relationship between VCT numbers and VCT network addresses, and query a network address of at least one second VCT according to a number of the at least one second VCT.

Optionally, the video conference system further includes a MCU 500 configured to initiate a multipoint conference call to a first VCT and at least two second VCTs according to network addresses of the at least two second VCTs and a network address of the first VCT when there are at least two called contacts.

Understandably, a UC-based software system is integrated with a hardware video conference system based on a DSP and embedded software in the embodiment of the present disclosure, a UC client incorporates related software modules, initiation of a video conference can be triggered on the UC client, and a video conference call can be answered using the UC client. Therefore, a called VCT in the embodiment of the present disclosure, which communicates with a UC-based video conference subsystem, is not necessarily a UC-based video conference subsystem, but may be a common VCT (that is, a conference terminal incorporating only modules such as an audio processing module, a video processing module, an audio and video codec chip, a signaling module, and a call control module), which is not limited by any embodiment of the present disclosure.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A unified communications (UC)-based video conference subsystem connected to a network, comprising:
    a video conference terminal (VCT);
    a PC (personal computer) host;
    a UC client;
    a user input device,
    wherein the UC client is installed on the PC host,
    wherein the PC host is connected to the network and the user input device,
    wherein the VCT is connected to the PC host,
    wherein the UC client further comprises:
        a VCT application module; and
        a UC-VCT communications module,
    wherein the VCT comprises:
        a video processing module;
        a call control module;
        a VCT-UC communications module,
        wherein the call control module is connected to the video processing module,
        wherein the VCT-UC communications module is connected to the call control module, wherein the VCT-UC communications module is configured to:
receive the call information of the called VCT sent by the UC-VCT communications module;
send the call information of the called VCT to the call control module;
receive the incoming video conference call message that comprises the incoming call number;
send the incoming video conference call message to the VCT application module using the UC-VCT communications module;
receive one of the call answer, reject request; and
send one of the call answer, reject request to the call control module wherein the call control module is configured to:
receive the call information of the called VCT;
initiate a video conference call to the called VCT according to the call information of the called VCT;
receive one of the call answer, reject request; and
perform one of the answering, rejecting operation on the incoming call, wherein the VCT application module is configured to:
receive a request for querying call information of a called VCT;
send the query request to a UC server, wherein the UC server connected to the network;
receive the call information of the called VCT that is returned by the UC server;
send the call information of the called VCT to the UC-VCT communications module;
receive an incoming video conference call message that comprises an incoming call number;
send a calling party information query request that comprises the incoming video conference call message to the UC server;
receive calling party information of the video conference call, wherein the calling party information is queried and obtained by the UC server according to the incoming call number;
output the calling party information of the video conference call in a visual manner;
receive one of the call answer, reject request input by a user; and
send the request to the UC-VCT communications module,
wherein the UC-VCT communications module is configured to:
establish a communication channel between the UC client and the VCT;
receive the call information of the called VCT;
send the call information of the called VCT to the VCT-UC communications module of the VCT;
receive the call answer or reject request; and
send the call answer or reject request to the VCT-UC communications module,
wherein the user input device is configured to:
receive the request for querying the call information of the called VCT; and
send the query request to the VCT application module.

2. The subsystem according to claim 1, wherein the video processing module of the VCT is further configured to:
implement switching among the following three types of images comprising:
a PC host interface image;
a video image captured on a local conference site; and
an acquired image of one or more other video conference sites; and
overlay of at least two of the three types of images.

3. The subsystem according to claim 1, wherein the PC host further comprises a user input device control module configured to implement switching, between the PC host and the VCT, of control rights on the user input device.

4. The subsystem according to claim 2, wherein the PC host further comprises a user input device control module configured to implement switching, between the PC host and the VCT, of control rights on the user input device.

5. A unified communications (UC)-based video conference call method, comprising:
receiving, by a video conference terminal (VCT) application module of a first UC client, a request for querying call information of a second VCT serving as a called party, wherein the second VCT is a VCT used by a called contact, and wherein the request comprises an identifier of the called contact;
sending, by the VCT application module of the first UC client, the query request to a UC server;
receiving the call information of the second VCT, wherein the call information is queried and obtained by the UC server according to the identifier of the called contact in the query request; and
sending, by the VCT application module of the first UC client, the call information of the second VCT to a call control module of a first VCT using a UC-VCT communications module of the first UC client and a VCT-UC communications module of the first VCT, to enable the call control module of the first VCT to initiate a video conference call to the second VCT according to the call information of the second VCT.

6. The method according to claim 5, further comprising:
sending the query request to a UC server by the VCT application module of the first UC client;
receiving the call information of the second VCT, wherein the call information is queried and obtained by the UC server according to the identifier of the called contact in the query request;
sending the query request to the UC server by the VCT application module of the first UC client;
receiving the network address of the second VCT, wherein the network address is queried and obtained by the UC server from a contact database according to the identifier of the called contact in the query request;
sending, by the VCT application module of the first UC client, the call information of the second VCT to a call control module of a first VCT using a UC-VCT communications module and a VCT-UC communications module of the first VCT, to enable the call control module of the first VCT to initiate a video conference call to the second VCT according to the call information of the second VCT;
sending, by the VCT application module of the first UC client, the network address of the second VCT to the call control module of the first VCT using the UC-VCT communications module and the VCT-UC communications module of the first VCT, to enable the call control module of the first VCT to initiate the video conference call to the second VCT according to the network address of the second VCT,
wherein the call information of the second VCT is a network address of the second VCT.

7. The method according to claim 5, wherein before sending, by the VCT application module of the first UC client, the query request to a UC server, the method further comprises:
registering, by the first VCT and the second VCT, with a gatekeeper (GK) in a video conference network; and establishing a mapping relationship between VCT numbers and VCT network addresses on the GK,
wherein sending, by the VCT application module of the first UC client, the query request to a UC server, and receiving the call information of the second VCT, wherein the call information is queried and obtained by the UC server according to the identifier of the called contact in the query request, comprises receiving, by the VCT application module of the first UC client, a number of the second VCT,
wherein the number is queried and obtained by the UC server from a contact database according to the identifier of the called contact in the query request,
wherein after the VCT application module of the first UC client sends the number of the second VCT to the VCT-UC communications module of the first VCT using the UC-VCT communications module,
wherein the method further comprises querying, by the VCT-UC communications module of the first VCT, the GK for a network address of the second VCT according to the number of the second VCT, and
wherein initiating, by the call control module of the first VCT, a video conference call to the second VCT according to the call information of the second VCT comprises initiating, by the call control module of the first VCT, the video conference call to the second VCT according to the network address of the second VCT.

8. The method according to claim 5, wherein when there are at least two second VCTs, the method further comprises:
sending network addresses of the at least two second VCTs to the first VCT by the VCT application module of the first UC client;
sending, by the VCT-UC communications module of the first VCT, a multipoint conference call request to a multipoint control server, wherein the request comprises the network addresses of the at least two second VCTs and a network address of the first VCT; and
initiating, by the multipoint control server, a multipoint conference call to the at least two second VCTs and the first VCT according to the network addresses of the at least two second VCTs and the network address of the first VCT in the request.

9. The method according to claim 6, wherein when there are at least two second VCTs, the method further comprises:
sending, by the VCT application module of the first UC client, network addresses of the at least two second VCTs to the first VCT;
sending, by the VCT-UC communications module of the first VCT, a multipoint conference call request to a multipoint control server, wherein the request comprises the network addresses of the at least two second VCTs and a network address of the first VCT; and
initiating, by the multipoint control server, a multipoint conference call to the at least two second VCTs and the first VCT according to the network addresses of the at least two second VCTs and the network address of the first VCT in the request.

10. The method according to claim 5, wherein when there are at least two second VCTs, wherein before sending, by the VCT application module of the first UC client, the query request to a UC server, the method further comprises:
registering, by the first VCT and the at least two second VCTs, with a GK in a video conference network; and
establishing a mapping relationship between VCT numbers and VCT network addresses on the GK,
wherein after the VCT application module of the first UC client sends the number of the second VCT to the VCT-UC communications module of the first VCT using the UC-VCT communications module, the method further comprises querying, by the VCT-UC communications module of the first VCT, the GK for network addresses of the at least two second VCTs according to numbers of the at least two second VCTs, and
wherein initiating, by the call control module of the first VCT, a video conference call to the second VCT according to the call information of the second VCT comprises sending, by the call control module of the first VCT, the network addresses of the at least two second VCTs and a network address of the first VCT to a multipoint control server, to enable the multipoint control server to initiate the video conference call to the at least two second VCTs and the first VCT.

11. The method according to claim 7, wherein when there are at least two second VCTs, before the sending, by the VCT application module of the first UC client, the query request to a UC server, the method further comprises:
registering, by the first VCT and the at least two second VCTs, with a GK in a video conference network; and
establishing a mapping relationship between VCT numbers and VCT network addresses on the GK,
wherein after the VCT application module of the first UC client sends the number of the second VCT to the VCT-UC communications module of the first VCT using the UC-VCT communications module, the method further comprises querying, by the VCT-UC communications module of the first VCT, the GK for network addresses of the at least two second VCTs according to numbers of the at least two second VCTs, and
wherein initiating, by the call control module of the first VCT, a video conference call to the second VCT according to the call information of the second VCT comprises sending, by the call control module of the first VCT, the network addresses of the at least two second VCTs and a network address of the first VCT to a multipoint control server, to enable the multipoint control server to initiate the video conference call to the at least two second VCTs and the first VCT.

12. A video conference terminal (VCT) comprising:
a video processing module;
a call control module; and
a VCT-unified communications (VCT-UC) communications module;
wherein the VCT-UC communications module connected to the call control module,
wherein the VCT-UC communications module is configured to:
receive call information of a called VCT sent by a unified communications-video conference terminal (UC-VCT) communications module;
send the call information of the called VCT to the call control module;
receive an incoming video conference call message that comprises an incoming call number;
send the incoming video conference call message to a VCT application module using the UC-VCT communications module;
receive a call answer or reject request; and
send the call answer or reject request to the call control module,
wherein the call control module is configured to:
receive the call information of the called VCT; and
initiate a video conference call to the called VCT according to the call information of the called VCT;
receive the call answer or reject request; and perform an operation of answering or rejecting the incoming call.

13. The VCT according to claim 12, wherein the video processing module of the VCT is further configured to:
implement switching among the following three types of images comprising:
a PC host interface image;
a video image captured on a local conference site; and
an acquired image of one or more other video conference sites; and
overlay of at least two of the three types of images.

14. A unified communications (UC) client, comprising:
a video conference terminal (VCT) application module;
a UC-VCT communications module,
wherein the VCT application module is configured to:
receive a request for querying call information of a called VCT;
send the query request to a UC server;
receive the call information of the called VCT that is returned by the UC server;
send the call information of the called VCT to the UC-VCT communications module;
receive an incoming video conference call message that comprises an incoming call number;
send a calling party information query request that comprises the incoming video conference call message to the UC server;
receive calling party information of the video conference call, wherein the calling party information is queried and obtained by the UC server according to the incoming call number;
output the calling party information of the video conference call in a visual manner;
receive a call answer or reject operation request input by a user; and
send the request to the UC-VCT communications module, and
wherein the UC-VCT communications module is configured to:
establish a communication channel between the UC client and the called VCT;
receive the call information of the called VCT;
send the call information of the called VCT to a VCT-UC communications module of the VCT;
receive the call answer or reject request; and
send the call answer or reject request to the VCT-UC communications module.

* * * * *